US007708325B2

(12) United States Patent
Grant

(10) Patent No.: US 7,708,325 B2
(45) Date of Patent: May 4, 2010

(54) SYSTEMS AND METHODS FOR ROTATION OF OBJECTS

(75) Inventor: Chad W. Grant, Campbell, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 1530 days.

(21) Appl. No.: 10/951,276

(22) Filed: Sep. 27, 2004

(65) Prior Publication Data

US 2006/0065773 A1 Mar. 30, 2006

(51) Int. Cl.
*B64D 45/00* (2006.01)

(52) U.S. Cl. .................................... 294/81.4; 294/81.3

(58) Field of Classification Search ................ 294/81.3, 294/81.4, 67.1, 67.21; 414/756
See application file for complete search history.

(56) References Cited

U.S. PATENT DOCUMENTS

| | | | | |
|---|---|---|---|---|
| 1,498,153 | A * | 6/1924 | Henry | 414/403 |
| 3,545,629 | A * | 12/1970 | Boers et al. | 414/756 |
| 3,596,968 | A * | 8/1971 | Holm | 294/81.4 |
| 3,602,544 | A * | 8/1971 | Marsh | 294/74 |
| 3,841,498 | A * | 10/1974 | Heidrich et al. | 414/756 |
| 4,017,109 | A * | 4/1977 | Belinsky | 294/67.21 |
| 4,245,941 | A * | 1/1981 | Charonnat | 294/81.3 |

OTHER PUBLICATIONS

ITNAC, Lifting Beams & Spreader Beams, www.itnac.com/beams.html, printed from Internet Aug. 3, 2004, 2 pgs.

ITNAC, Flip-Rite Handling System, http://www.itnac.com/fliprite.html, printed from Internet Jun. 23, 2004, 3 pgs.

ITNAC, "Engineered to Serve Your Lifting Problems", http://www.itnac.com/home.html, printed from Internet Aug. 3, 2004, "labeled © 1997".

ITNAC, Special Application Products, http://www.itnac.com/custom.html, printed from Internet Aug. 3, 2004, 2 pgs.

ITNAC, Pallet Lifters, http://www.itnac.com/pallet.html, printed from Internet Aug. 3, 2004, 1 pg.

ITNAC, Photo Library: Flip-Rite, http://www.itnac.com/photo_library/fliprite.html, printed from Internet Aug. 3, 2004, 2 pgs.

(Continued)

*Primary Examiner*—Paul T Chin
(74) *Attorney, Agent, or Firm*—O'Keefe, Egan, Peterman & Enders, LLP

(57) ABSTRACT

Systems and methods for rotating objects that shift the center of gravity of an object, such as a wing assembly, from a position outside the rotation axis area of the object to a position within the rotation axis area of the object. In one example, a material handling system that employs rotatable slings may be used to rotate an object by shifting the suspended center of gravity from a position outside the rotation axis area (i.e., outside the rotatable slings in at least one position of rotation) to a position within the rotation axis area (i.e., between the slings at all positions of rotation). The suspended center of gravity may be shifted using at least one ballast component (or other suitable force-applying device) that exerts a force on the object in a direction and magnitude sufficient to so shift the suspended center of gravity of the object.

24 Claims, 8 Drawing Sheets

OTHER PUBLICATIONS

ITNAC, Photo Library: Lifting Beams, http://www.itnac.com/photo_library/lifting_beam.html, printed from Internet Aug. 3, 2004, 1 pg.

ITNAC, Articulated Jib Cranes, http://www.itnac.com/jibs.html, printed from Internet Aug. 3, 2004. 1 pg.

ITNAC, Roll Handling Products, http://www.itnac.com/roll.html, printed from Internet Aug. 3, 2004, 2 pgs.

ITNAC, Coil Handling Products, http://www.itnac.com/coil.html, printed from Internet Aug. 3, 2004, 3 pgs.

ITNAC, Photo Library: Roll & Coil Handling, http://www.itnac.com/photo_library/roll.html, printed from Internet Aug. 3, 2004, 1 pg.

ITNAC, Photo Library: Special Application Equipment, http://www.itnac.com/photo_library/custom.html, printed from Internet Aug. 3, 2004, 2 pgs.

ITNAC, Powered Sling Safely And Efficiently Turns Large Engine Blocks, http://www.itnac.com/powered _sling.html, printed from Internet Aug. 3, 2004, labeled "Reprinted From Jan. 1989 issue of Plant Services", 2 pgs.

Search Report; PCT/US05/32598; Sep. 29, 2008; 4 pgs.

* cited by examiner

FIG. 1 - Prior Art

SYSTEMS AND METHODS FOR ROTATION OF OBJECTS

This invention was made with United States, Government support under Contract No. N00019-03-C-0063. The Government has certain rights in this invention.

BACKGROUND OF THE INVENTION

1. Field of the Invention

This invention relates generally to rotation of objects, and more particularly to rotation of an object having a suspended center of gravity that lies within the rotation axis area of the object.

2. Description of the Related Art

Often times it is desirable to lift and rotate large pieces of equipment to gain access to all sides of the equipment In this regard, handling systems have been developed that lift and rotate objects such as rail cars, trailer frames, engine blocks, etc. Such handling systems include powered sling material handling systems such as a FLIP-RITE™ handling system available from ITNAC Corporation of Birdsboro, Pa. A powered sling material handling system employs continuous powered slings that are suspended from an overhead device that may be hung from a bridge crane or trolley hoist. Each of the continuous powered slings are passed over a rotating drum of the overhead device and around the object to be handled so as to enclose the suspended center of gravity of the object. The object is lifted by raising the overhead device and the attached slings that surround the device. The lifted object is then rotated by turning the rotating drums and slings of the overhead device using electric gear motors.

In the past, powered sling material handling systems have been used to suspend and rotate P3 Orion aircraft wing boxes to provide access to the lower wing surface for maintenance and repair. During such an operation, engines, leading edge, and trailing edge assembly are removed from the wing assembly prior to lifting and rotating the wing box. In this regard, FIG. 1 illustrates a wing box portion 100 of a disassembled wing assembly suspended above a horizontal floor surface 103 and rotated into vertical position using a conventional powered sling material handling system. As shown in FIG. 1, leading and trailing edge assemblies have been removed from wing box 102, and an end cap fitting is attached to the root edge 106 of wing box 100 that includes two lifting horns 108*a* and 108*b* that create two support points 109*a* and 109*b*. The distance between lifting horns 108*a* and 108*b* may be adjustable. Removal of leading and trailing edge assemblies, and installation of the end cap fitting are performed while wing box 100 rests in an upright horizontal position upon a wing support tool (not shown).

Prior to lifting wing box 100 from its horizontal position on the wing support tool, a first continuous sling 120 is passed around the body 102 of wing box 100 and around spacers or standoff devices 114*a* and 114*b* at an outboard position toward the wing tip edge 110 of the wing box 100 so that it is in position to contact the leading edge of the wing box 100 at support point 112*a* and to contact the trailing edge of wing box 100 at support point 112*b*. A second continuous sling 122 is passed around lifting horns 108*a* and 108*b* of the end cap fitting. As illustrated by the dashed hash lines in FIG. 1, support points 112*a* and 112*b* and support points 109*a* and 109*b* together define a rotation axis area 107 that encloses the suspended center of gravity 130 of wing box 100, i.e., so that the suspended center of gravity 130 stays between continuous slings 120 and 122 at all positions during rotation operations. Furthermore, the position of the suspended center of gravity is at or near the axis of rotation 190 of wing box 100. The distance between support points 109*a* and 109*b* is equal to the distance between support points 112*a* and 112*b*, support point 109*a* is horizontally aligned with support point 112*a*, and support point 109*b* is horizontally aligned with support point 112*b*. This equidistant and horizontally aligned support point configuration allows continuous slings 120 and 122 to rotate wing box 100 in an even manner or 1:1 relationship (i.e., rotation speed of continuous sling 120 is the same as the rotation speed of continuous sling 122) without inducing excess torque on the wing box.

As shown in FIG. 1, continuous slings 120 and 122 are passed around rotating drums 140 and 142 of lifting device 150 that is supported at pick point 170, e.g., by hoist. Lifting device 150 is then raised at pick point 170 in the direction of arrow 172 to lift wing box 100, still in horizontal position, from the wing support tool. Once clear of the wing box 100, now supported by continuous slings 120 and 122, is rotated by simultaneously turning rotating drums 140 and 142 of lifting device 150, e.g., as illustrated by arrows 174 and 176 to rotate leading edge of wing box 100 downward while maintaining wing box 100 in a position parallel to horizontal floor surface 103. In this manner wing box 100 may be rotated in the direction of arrow 160 through a vertical position (shown in FIG. 1) to a horizontal upside down position, i.e., so that its lower surface faces upward. Pick point 170 may be variably positioned relative to horizontal beam 151 of lifting device 150 as shown by arrows 171, i.e., so that pick point 170 may be vertically aligned with suspended center of gravity 130 as shown. This is necessary where center of gravity of beam 151 is not horizontally aligned with suspended center of gravity 130, and may be accomplished by lifting wing box 100 by a distance of about 1" above the wing support tool and then rebalancing the suspended load by repositioning pick point 170.

Although the above-described wing rotation method using powered sling material handling systems has simplified the process of lifting and rotation of aircraft wing box portions of disassembled wing assemblies, both the moving and stationary components of the trailing edge assembly of a P3 Orion aircraft wing assembly (including stationary flap and aileron sections) are removed from the wing box prior to lifting and rotation to ensure that the suspended center of gravity of the wing box is enclosed within an area defined between the support points and lifting horns and is near the axis of rotation of the wing assembly. Otherwise, the wing box may become unstable during the lifting and/or rotation process, and/or excessive torque may be required to rotate the wing box. Removal of the entire trailing edge assembly (i.e., moving and stationary components) is a time consuming and labor intensive operation (e.g., requiring 680 man-hours of time).

SUMMARY OF THE INVENTION

Disclosed herein are systems and methods for rotating objects, such as wing assemblies. The disclosed systems and methods may be used to rotate objects, for example, using a material handling system that employs rotatable slings. The disclosed systems and methods may be advantageously implemented to rotate an object having a suspended center of gravity that lies outside the rotation axis area of conventional powered sling material handling systems by shifting the suspended center of gravity of the object to fall within the rotation axis area.

In one embodiment, the disclosed systems and methods may be advantageously implemented to rotate objects having a suspended center of gravity that lies outside the rotation axis area of a material handling system (i.e., the suspended center of gravity of the object has a position that falls outside the attached slings of the material handling system in at least one position of rotation) by shifting the suspended center of gravity of the object to fall within the rotation axis area of the material handling system (i.e., so that the suspended center of gravity stays in a position that is between the slings of the material handling system at all positions of rotation). For example, the suspended center of gravity of an object may be shifted using at least one ballast component (or other suitable force-applying device) that is attached or otherwise coupled to exert a force on the object in a direction and magnitude that is sufficient to shift the suspended center of gravity of the object from a point outside the rotation axis area to a point within the rotation axis area of a material handling system that is being employed to rotate the object.

In one exemplary embodiment, a ballast pendant may be provided that attaches to the end cap fitting of a powered sling material handling system that is employed to rotate an aircraft wing assembly (e.g., such as a P3 Orion wing assembly) with one or more trailing edge wing components of the trailing edge assembly left intact and unremoved. In such an exemplary embodiment, the ballast pendant shifts the suspended center of gravity of the wing assembly (with trailing edge components) from a point that lies outside the rotation axis area to a point that lies within the rotation axis area so that the wing assembly may be rotated in a stable manner with the trailing edge components attached.

In one respect, disclosed herein is a method of rotating an object having a center of gravity located at a first position within the object. The method may include: suspending a first end of the object from a first set of spaced support points; suspending a second end of the object from a second set of spaced support points; and rotating the object simultaneously about the first and second sets of spaced support points, wherein a rotation axis area is defined between the first set of spaced support points and the second set of spaced support points; and applying at least one force to the object that is sufficient to shift the suspended center of gravity of the object from a position outside the rotation axis area to a position within the rotation axis area.

In another respect, disclosed herein is a method of rotating an aircraft wing assembly having a center of gravity located at a first position within the wing assembly. The method may include: suspending a first end of the wing assembly from a first set of spaced support points provided at a root edge of the wing assembly; suspending a second end of the wing assembly from a second set of spaced support points provided at a position between the root edge and the wing tip edge of the wing assembly; rotating the wing assembly simultaneously about the first and second sets of spaced support points, wherein a rotation axis area is defined between the first set of spaced support points and the second set of spaced support points; and applying at least one force to the wing assembly that is sufficient to shift the suspended center of gravity of the wing assembly from a position outside the rotation axis area to a position within the rotation axis area.

In another respect, disclosed herein is a system for rotating objects. The system may include: a first set of spaced support points configured to suspend and rotate a first end of the object; a second set of spaced support points configured to suspend and rotate a second end of the object, a rotation axis area being defined between the first set of spaced support points and the second set of spaced support points; and a force application device configured to apply at least one force to the object that is sufficient to shift the suspended center of gravity of the object from a position outside the rotation axis area to a position within the rotation axis area.

In another respect, disclosed herein is an apparatus configured for attachment to a root edge of a wing assembly. The apparatus may include an end fitting having first and second lifting horns; and a force application device configured for attachment to the end fitting.

DESCRIPTION OF ILLUSTRATIVE EMBODIMENTS

Figure 2:
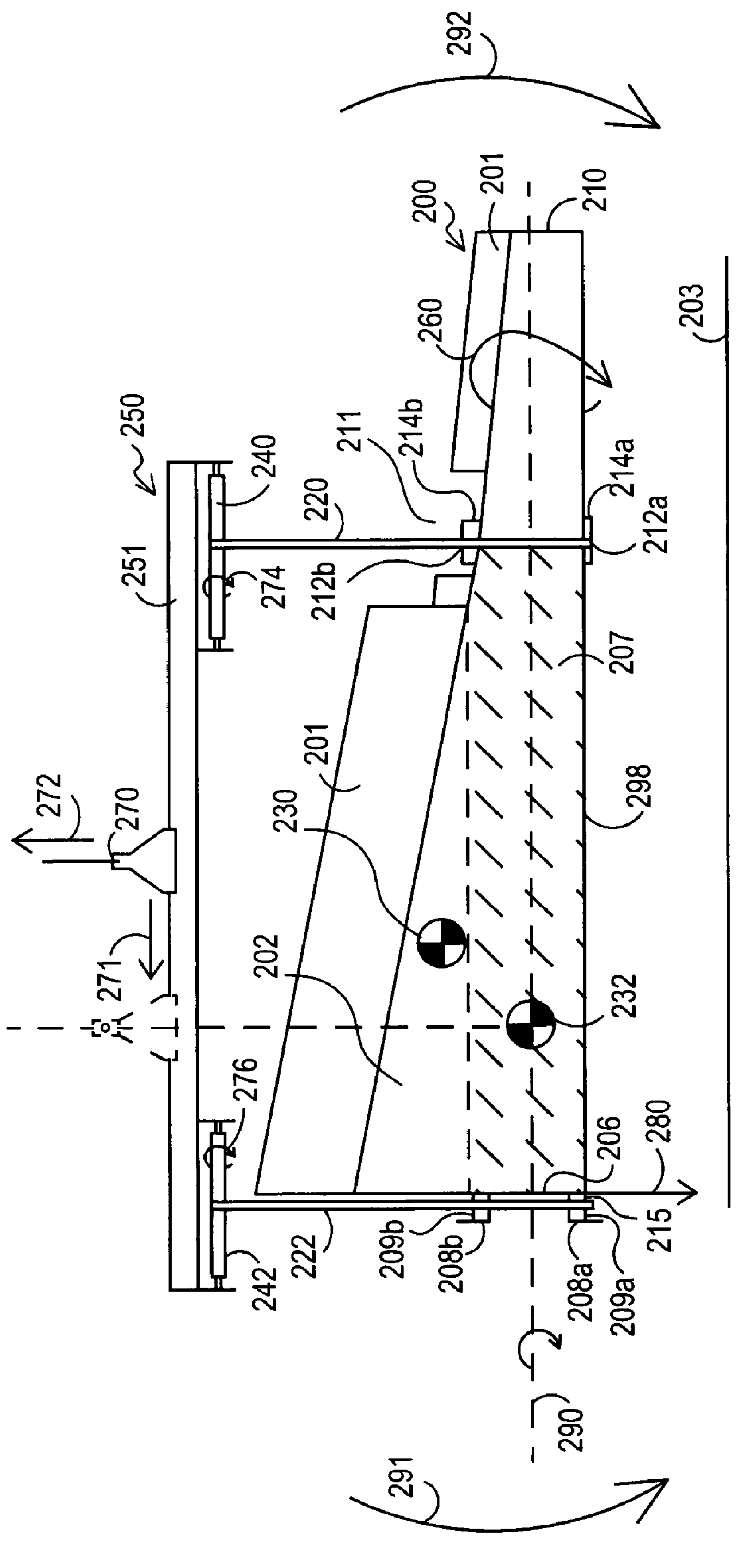
FIG. 2 illustrates a side view of a wing assembly suspended and rotated into vertical position according to one embodiment of the disclosed systems and methods.

FIG. 2 illustrates a wing assembly 200 suspended above a horizontal floor surface 203 and rotated into vertical position according to one exemplary embodiment of the disclosed systems and methods. As shown in FIG. 2, stationary trailing edge components 201 (e.g., flap section, aileron section, etc.) of the trailing edge assembly are attached to wing box 202 (i.e., stationary flap and aileron sections remain intact and have not been removed from the wing assembly). An end fitting in the form of an end cap is attached to the root edge 206 of wing assembly 200, and includes two lifting horns 208*a* and 208*b* that create two support points 209*a* and 209*b*. Installation of the end fitting is performed while wing assembly 200 rests in an upright horizontal position upon a wing support tool (not shown). In the illustrated embodiment of FIG. 2, the leading edge 298 of wing box 202 is positioned parallel to floor surface 203.

As shown in FIG. 2, a segment of the trailing edge assembly (e.g., a 51.5" upper skin panel between flap and aileron sections at a position about 136" from the wing tip of P3 wing assembly) have been removed, leaving a gap 211 in the trailing edge assembly for accommodating a continuous sling 220 passed around a structural part of the wing assembly at a position between the wing root edge and wing tip edge of the wing assembly. Gap 211 may also be present to accommodate an optional trailing edge spacer or standoff device 214*b* at an outboard position toward the wing tip edge 210 of the wing assembly 200, and in a position that is opposite an optional leading edge spacer or standoff device 214*a*. In this embodiment, spacer or standoff devices 214*a* and 214*b* are used to protect the upper and lower spar caps. It may also be desirable to remove the piano hinge locally in this area to prevent damage.

In the practice of the disclosed systems and methods, removal of one or more trailing edge components to leave one or more gaps is optional, and may be practiced as desired or needed to fit the requirements of a particular wing assembly. For example, in some embodiments no trailing edge components may be removed, and in other embodiments trailing edge components may be removed to form more than one gap in a trailing edge assembly, e.g., to accommodate two or more continuous slings that are passed around a structural part of a wing assembly (e.g., wing box) at positions between the wing root edge and wing tip edge of the wing assembly.

Optional spacer/standoff devices 214 may be employed as necessary or desired to provide parallel leading and trailing edge contact surfaces for slings 220 and 222 as described further below, to provide protection for leading and trailing edge surfaces of wing box 202 (to prevent damage to front and rear spars), etc. In this regard, spacer/standoff devices 214 may be of any suitable configuration, and may be provided with a contoured or shaped contacting surface that is shaped complimentary to leading and trailing edge surfaces of wing box 202, i.e., for contacting and mating with leading and trailing edge surfaces of wing box 202. In one embodiment, spacer/standoff devices 214 may be manufactured from machinable "red block" material, and may be provided with carpeted or other soft surface/s for contacting leading and trailing edge surfaces of wing box 202. In one embodiment, clearance holes may be provided in spacer/standoff devices to provide clearance in all areas in contact with fasteners, e.g., such as Hiloc fasteners. Further, spacer/standoff devices may have slots cut in them that mate with protruding angle stiffeners in front and rear spars. Proper placement may be determined by snug mating between these two surfaces.

One or more suitably sized openings or contours may be optionally provided in the contacting surface of spacer/standoff devices 214 to allow clearance for one or more wing components (e.g., stiffeners, collars, other wing structural components, etc.) that may be present at and/or extend from leading and/or trailing edge surfaces of wing box 202. Such openings may be provided so that such wing components do not have to be removed when spacer/standoff devices 214 are installed to wing box 202. The interior of spacer/standoff devices 214 may also be at least partially hollow (e.g., on the ends of a spacer/standoff device) or open in order to reduce weight, e.g., to allow for easy manual handling. It may be desirable that areas which take the load of the wing (e.g., middle section of a spacer/standoff device) be left solid.

Prior to lifting wing assembly 200 from its horizontal position on the wing support tool, a first continuous sling 220 is passed around the body of the wing box 202 and around spacers or standoff devices 214*a* and 214*b* so that it is in position to contact the leading edge of the wing assembly 200 at support point 212*a* and to contact the trailing edge of wing assembly 100 at support point 212*b*. A second continuous sling 222 is passed around lifting horns 208*a* and 208*b* of the end fitting. As illustrated, the distance between support points 209*a* and 209*b* is substantially equal to the distance between support points 212*a* and 212*b*, support point 209*a* is substantially horizontally aligned with support point 212*a*, and support point 209*b* is substantially horizontally aligned with support point 212*b*. This substantially equidistant and substantially horizontally aligned support point configuration allows continuous slings 220 and 222 to rotate wing assembly 200 in an even manner or 1:1 relationship (i.e., rotation speed of continuous sling 220 is the same as the rotation speed of continuous sling 222) without inducing excess torque on the wing assembly. In one embodiment, during rotation the leading edge is kept directed downward first and parallel with ground at all times.

The lateral positioning of trailing edge gap 211 relative to the longitudinal axis of wing assembly 200 (i.e., how far toward the tip edge 210 of wing assembly 200 that gap 211 is located from the root edge of wing assembly 200) may be any position suitable for providing support points 212 for first continuous sling 220 that together with support points 209 provided for a second continuous sling 222 may be cooperatively employed to lift and rotate wing assembly 200 in a substantially stable manner as described further herein.

Referring to FIG. 2, horizontal beam 251 may be leveled and continuous slings 220 and 222 may be passed around rotating drums 240 and 242 of lifting device 250 (e.g., powered sling material handling systems such as a FLIP-RITE™ handling system available from ITNAC Corporation of Birdsboro, Pa.) that is supported at pick point 270, e.g., by hoist. Lifting device 250 may then be raised at pick point 270 in the direction of arrow 272 to lift wing assembly 200, still in horizontal position, from the wing support tool. Wing assembly 200 may be lifted a few inches above the wing support tool, and horizontal beam 251 re-leveled by adjusting the pick point prior to further lifting and moving of wing assembly 200 clear of the wing support tool. Once clear of the wing support tool, wing assembly 200, now supported by continuous slings 220 and 222, may be rotated by simultaneously turning rotating drums 240 and 242 of lifting device 250, e.g., as illustrated by arrows 274 and 276. In this manner wing assembly 200 may be rotated in the direction of arrow 260 through a vertical position (shown in FIG. 2) to a horizontal upside down position, i.e., so that its lower surface faces upward.

In one embodiment, the lateral position of trailing edge gap 211 may be any lateral position selected so that first and second continuous slings 220 and 222 straddle the suspended center of gravity of wing assembly 200, and so that pick point 270 is positioned (or may be variably positioned in one exemplary embodiment) to substantially balance root edge moment of inertia 291 with wing tip moment of inertia 292, i.e., so that the lateral position of pick point 270 substantially coincides with the lateral position of the suspended center of gravity of wing assembly 200 and so that the weight supported by rotating drum 240 is substantially equal to the weight supported by rotating drum 242 of lifting device 250 during lifting and/or rotation operations. In one exemplary embodiment, pick point 270 may be variably positioned in relative to horizontal beam 251 of lifting device 250 as indicated by arrow 271 and dashed outline of an alternate pick point location to vertically coincide with the lateral position of the suspended center of gravity of wing assembly 200 during lifting and/or rotation operations. In the context of this exemplary embodiment, it will be understood that the "suspended center of gravity" refers to the effective center of gravity of suspended wing assembly 200 when supported by lifting device 250, i.e., including root edge end fitting and spacer/stand-offs 214.

Although a lifting device 250 having a variable pick point 270 is described and illustrated herein, it will be understood that this is not necessary and that the disclosed systems and methods may be practiced using a lifting device that employs a non-variably positionable pick point as well. Furthermore, benefit of the disclosed systems and methods may be realized with lifting devices that are supported and/or raised using more than one pick point (e.g. two or more pick points).

As illustrated by the dashed hash lines in FIG. 2, support points 212*a* and 212*b* and support points 209*a* and 209*b* together define a rotation axis area 207. As further illustrated in FIG. 2, distance between support points 209*a* and 209*b* is less than the length of root edge 206 of wing assembly 200, i.e., so that the entire wing assembly 200 is not captured within the rotation axis area 207. It will be understood that the disclosed systems and methods may be employed to suspend and rotate other objects having at least one end that has a length greater than the distance between the individual support points of a support point pair, and/or in which the entire object is not captured within the rotation axis area (i.e., at least a portion of the object lies outside the rotation axis area). Examples of such objects include, but are not limited to, irregular objects, triangular or other angular-shaped objects, non-square shaped objects, non-rectangular shaped objects, etc.

Figure 1:
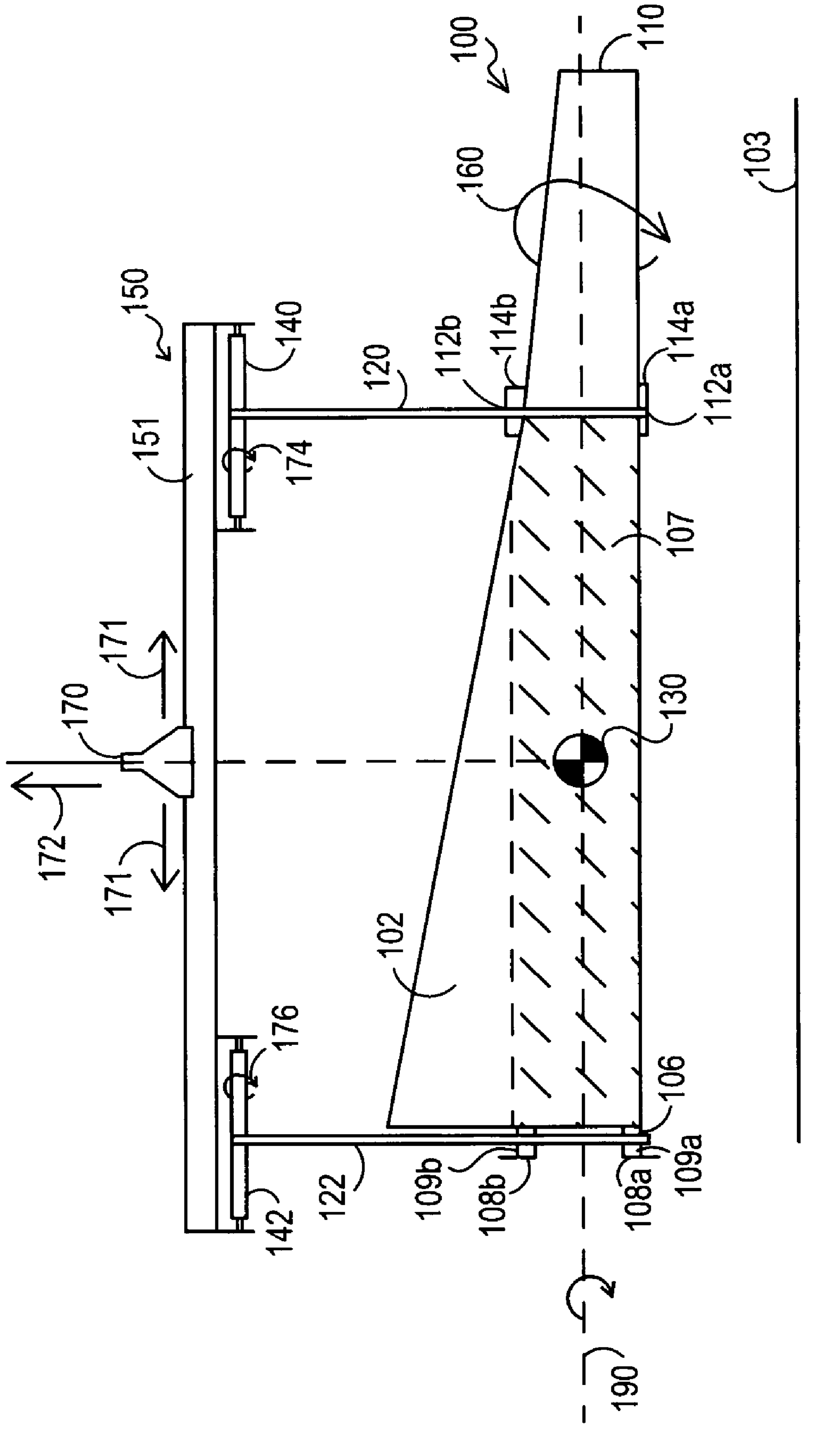
FIG. 1 illustrates a side view of a disassembled wing assembly suspended and rotated into vertical position using a conventional powered sling material handling system.

FIG. 2 illustrates non-adjusted suspended center of gravity 230 of wing assembly 200 that exists in the absence of any external applied force. As shown, presence of stationary trailing edge components 201 cause non-adjusted center of gravity 230 to be positioned closer to the trailing and root edges of wing box 202 than is center of gravity 130 of wing box 100 of FIG. 1 that has its trailing edge assembly removed. As a result, non-adjusted suspended center of gravity 230 falls outside rotation axis area 207, e.g., so that the center of gravity 230 does not fall between continuous slings 220 and 222 in a horizontal position. Thus, without adjustment, non-adjusted suspended center of gravity 230 will cause wing assembly 200 to be unbalanced (or trailing edge heavy) when suspended in a horizontal position by continuous slings 220 and 222 of lifting device 250, and will be unstable and require greater torque to rotate wing assembly 200 to a vertical position. Furthermore, non-adjusted center of gravity 230 will cause wing assembly 200 to "swing" in an unstable manner as it is rotated about rotation axis 290 (i.e., to swing in a trailing edge direction as it is rotated from horizontal to vertical position, and to swing in a leading edge direction as it is rotated back from vertical to horizontal position).

In the practice of the disclosed systems and methods, one or more external forces may be applied that have location, magnitude and direction that are effective to shift the suspended center of gravity of a suspended wing assembly to a selected position, e.g., to a selected position that is within the rotation axis area of the suspended wing assembly from a position that is outside the rotation axis area of the suspended wing assembly. For example, still referring to the exemplary embodiment of FIG. 2, an external force 280 may be downwardly applied to shift the suspended center of gravity of wing assembly 200 to a selected position that is within rotation axis area 207, e.g., as represented by adjusted suspended center of gravity 232 in FIG. 2. In the illustrated embodiment, adjusted suspended center of gravity 232 is also shown positioned at or near axis of rotation 290 of wing assembly 200, i.e., so that the adjusted suspended center of gravity 232 of said wing assembly 200 is substantially intersected by said axis of rotation 290. In the embodiment shown, adjusted suspended center of gravity 232 is located at a position relative to wing assembly 200 that is forward and inboard of non-adjusted suspended center of gravity 230. As further illustrated, pick point 270 is moved in the direction of arrow 271 to a position that is vertically aligned with adjusted center of gravity 232 so that moments 291 and 292 are balanced about the pick point.

Using the disclosed systems and methods one or more external forces may be applied to a wing assembly in any manner or manners suitable for shifting the suspended center of gravity of a suspended wing assembly to a selected position. For example, a single external force of substantially uniform magnitude (such as external force 280 of FIG. 2), may be applied at a given location of a suspended wing assembly (such as suspended wing assembly 200 of FIG. 2) in a substantially uniform direction, regardless of position of rotation (horizontal upright position, vertical position, horizontal inverted position, etc.) of wing assembly 200 as will be further described below in relation to the exemplary embodiment of FIGS. 3-7. However, it will be understood that more than one force may be applied to a suspended wing assembly at one or more locations and/or in one or more directions, and/or that the force/s may vary in direction, location and/or magnitude (e.g. in a non-uniform manner) as a suspended wing assembly is rotated about a rotation axis of the suspended wing assembly.

FIGS. 3-7 illustrate one exemplary embodiment as it may be employed to apply an external force 280 to a suspended wing assembly 200 to shift the suspended center of gravity of the wing assembly to fall within the rotation axis area of the suspended wing assembly. In FIGS. 3-7, direction of rotation is indicated by arrows for rotating suspended wing assembly 200 from horizontal upright position to horizontal inverted position (e.g., about 180 degrees of rotation), it being understood that rotation in the opposite direction may be employed to rotate suspended wing assembly 200 from horizontal inverted position back to horizontal upright position (e.g., prior to re-assembly of wing assembly 200 to an aircraft fuselage).

Figure 3:
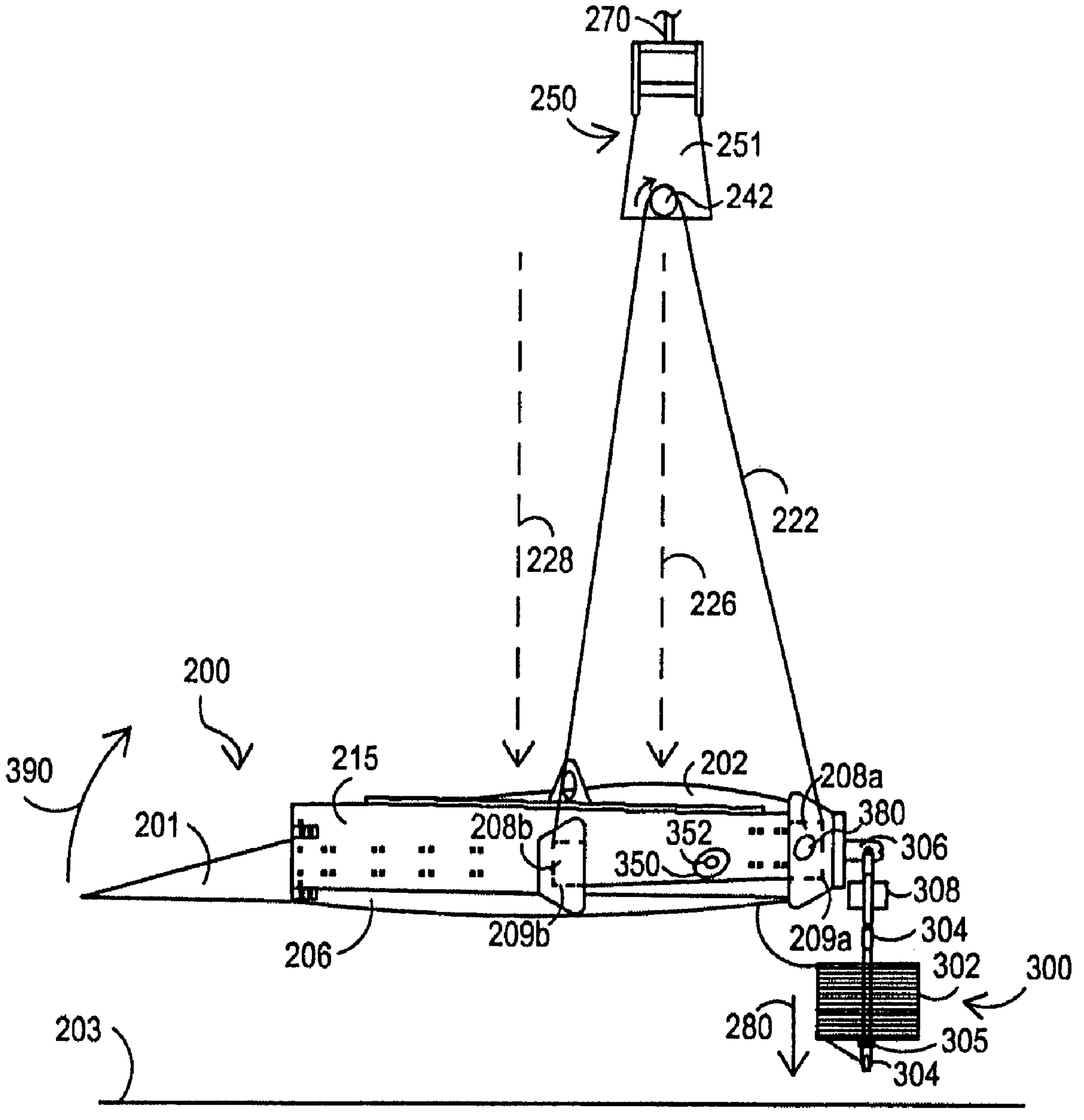
FIG. 3 illustrates a root edge end view of a wing assembly suspended in upright horizontal position according to one exemplary embodiment of the disclosed systems and methods.

FIG. 3 illustrates a root edge end view of a wing assembly 200 that is suspended above a horizontal floor surface 203 in upright horizontal position by continuous slings 222 and 220 (continuous sling 220 being directly behind continuous sling 222 and therefore not visible) and lifting device 250, e.g., after being removed from an aircraft and lifted from a wing support tool. As illustrated in FIG. 3, suspended wing assembly 200 includes stationary trailing edge components 201 attached to wing box 202. In FIG. 3, dashed line 228 represents a vertical projection of non-adjusted suspended center of gravity of suspended wing assembly 200. As may be seen, the position of the non-adjusted suspended center of gravity does not lie between continuous slings 222 and 220, but instead is located aft and outside of the rotation axis area of the suspended wing assembly, i.e., at a position between support points 209 and trailing edge components 201. As previously described and illustrated in relation to FIG. 2, the presence of attached trailing edge components 201 acts to shift the suspended center of gravity of a suspended wing assembly in direction aft toward the trailing edge of the wing assembly, as compared to the suspended center of gravity of the same wing assembly without attached trailing edge components 201.

Still referring to the exemplary embodiment of FIG. 3, a force application device in the form of a pendant weight assembly 300 is provided for applying external force 280 in a manner that shifts the suspended center of gravity forward toward the leading edge of the suspended wing assembly to a position represented by the vertical projection of dashed line 226. As shown the position of the adjusted suspended center of gravity represented by dashed line 226 lies between continuous slings 222 and 220, and is located inside the rotation axis area of the suspended wing assembly. In the exemplary embodiment of FIG. 3, pendant weight assembly 300 is coupled to a root edge end fitting that itself is coupled to root edge 206 of suspended wing assembly 200. In a manner as previously described, the root edge end fitting of this exemplary embodiment includes an end cap 215 that is attached to the root edge 206 of wing assembly 200, and that includes two lifting horns 208*a* and 208*b* that create two support points 209*a* and 209*b* for continuous sling 222.

In one embodiment, end cap 215 may be configured to include a steel plate that is fastened to the root edge 206 of wing assembly 200 with one or more suitably sized openings 350 optionally provided in the steel plate to allow clearance for one or more wing components 352 (e.g., projecting control lines, hoses, nozzles, wing structural components, etc.) that may be present at and/or extend from root edge 206. Such openings may be provided so that such wing components 352 do not have to be removed when end cap 215 is attached to wing box 202. In another embodiment, end cap 215 may be configured so that the distance between lifting horns 208*a* and 208*b* is adjustable.

As illustrated, pendant weight assembly 300 includes pendant ballast in the form of multiple ballast weights 302 that each are removably attachable to pendant tension rod 304, which is in turn coupled to root edge end cap 215 by eyelet 306 in a manner so that tension rod 304 is capable of pivoting relative to root edge end cap 215 as wing assembly 200 is rotated in the direction of arrow 390 (and so that force 280 is exerted in a substantially uniform downward direction as wing assembly 200 is so rotated), i.e., so that ballast weights 302 and tension rod 304 remain substantially in place while wing assembly 200 is rotated around them. In the illustrated embodiment, ballast weights 302 and tension rod 304 are configured so that the amount of weight of pendant weight may be changed in order to vary the magnitude of external force 280 by changing the number and/or weight of individual ballast weights 302 that are hung from pendant tension rod 304 (e.g., to shift the suspended center of gravity of the wing assembly by the desired or selected amount).

Ballast weights 302 may be removably attachable to pendant tension rod 304 using any suitable configuration, e.g., each of ballast weights 302 may be configured with an opening for receiving tension rod 304 (which may be threaded as illustrated by darker portion of rod 304) through the center thereof, and with a threaded fastener 305 threaded onto rod 304 from the underside to secure ballast weights 302 to tension rod 304. In one embodiment, a ballast weight 302 may be configured with an elongated opening extending to the edge of the weight 302, e.g., so that the weights 302 may be slid onto rod 304 of pendant assembly 300 from the side without removing threaded fastener 305. As illustrated in FIG. 3, an optional lifting bracket 308 may be provided on torsion rod 304 for handling pendant weight assembly 300.

With regard to FIG. 3, it will be understood that the illustrated embodiment of pendant weight assembly 300 is exemplary only, and that a pendant weight assembly may employ and other suitable type and configuration of ballast weight and/or ballast weight securing mechanism/s capable of exerting an external force 280. For example, multiple ballast weights 302 may be replaced with a single ballast weight of desired density. Alternatively, a ballast container may be pivotably attached to a root edge end cap 215 (e.g., by eyelet and tension rod or other suitable mechanism) that is configured to contain solid and/or liquid ballast material (e.g., so that solid and/or liquid ballast material may be added or subtracted from the container so that that may be incrementally added or subtracted to achieve a desired external force 280. It is also possible that force application device may be provided that is configured to applying external force 280 using alternative types of force application mechanisms, e.g., mechanical, electromechanical, electromagnetic, etc. For example a cable or rod may be pivotably attached to root edge end cap 215 (e.g., by eyelet) and used to apply external force 280 by mechanical or electromechanical force, rather than by using a pendant weight assembly.

It will also be understood that the point of application of external force 280 may vary, i.e., the point of attachment of eyelet 306 to root edge end cap 215 shown in FIG. 3 is exemplary only. In this regard, any other alternative force application point or multiple force application points may be used that are suitable for applying an external force/s of any magnitude/s and/or direction/s to a suspended wing assembly in any manner or manners suitable for shifting the suspended center of gravity of a suspended wing assembly to a selected position. For example, a pendant weight assembly may be provided that pivotably attaches in another position to root edge end cap 215, e.g., using a tension rod with eyelet or bearing that rotatably attaches to a pivot pin 380 shown in dashed outline adjacent to lifting horn 208*a* and, extending in a direction outward from the page in FIG. 3. Furthermore, it is not necessary that a force application device be provided that attaches to a root edge end fitting, and/or that applies an external force/s to a suspended wing assembly at a point/s on a root edge end fitting. In this regard, one or more external forces may be applied indirectly or directly to a component/s of a wing assembly itself (e.g., wing box, leading edge, trailing edge, etc.) at any position/s (e.g., from inboard to outboard position, and/or from leading to trailing edge position) that is suitable for shifting the suspended center of gravity of a suspended wing assembly to a selected position.

Figure 4A:
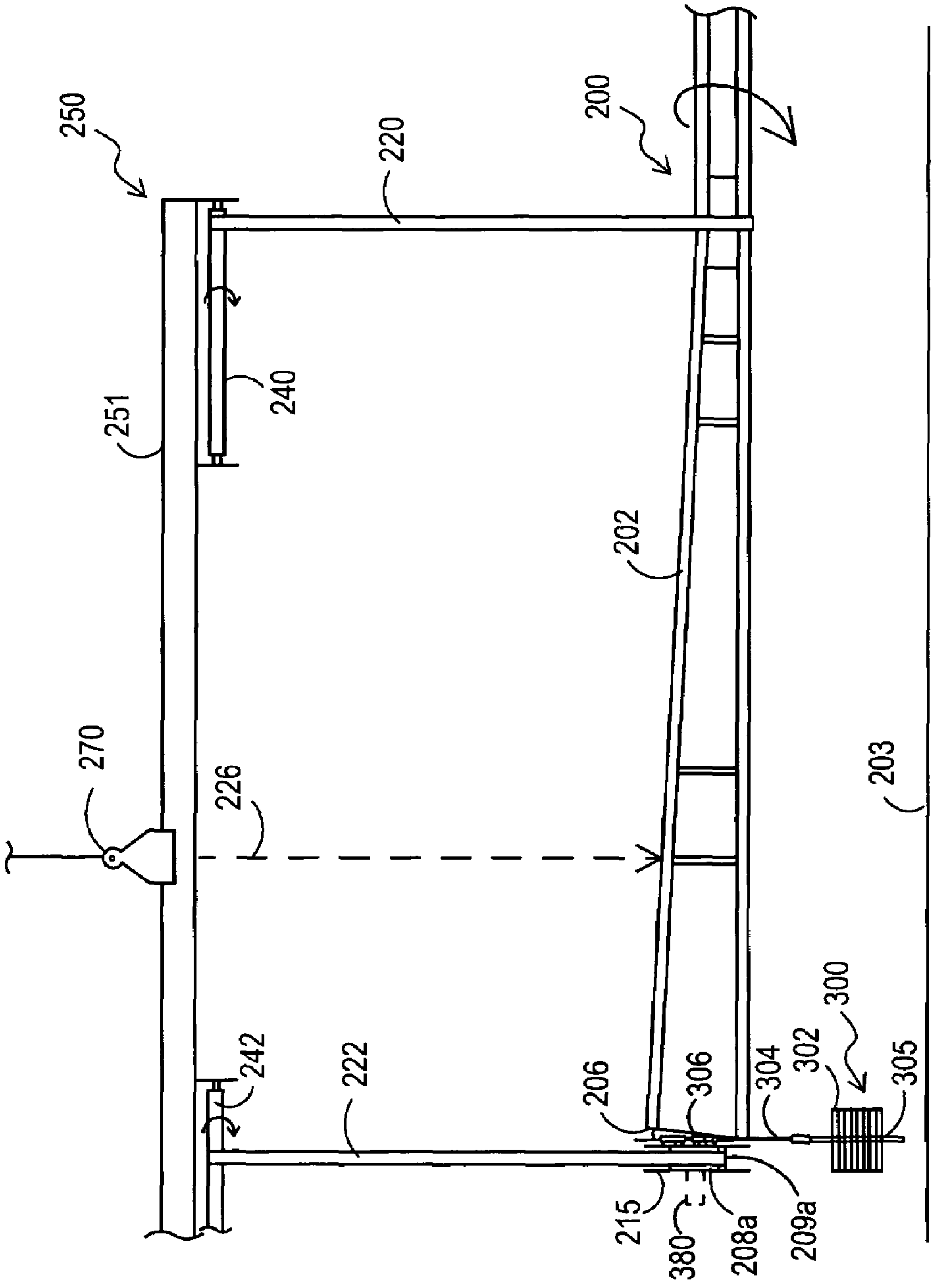
FIG. 4A illustrates a leading edge end view of a wing assembly suspended in upright horizontal position according to one exemplary embodiment of the disclosed systems and methods.

FIG. 4A illustrates a leading edge end view of wing assembly 200 of FIG. 3 that is suspended above a horizontal floor surface 203 in upright horizontal position by continuous slings 222 and 220, and lifting device 250, e.g., after being removed from an aircraft and lifted from a wing support tool. FIG. 4A shows pick point 270 positioned over the adjusted suspended center of gravity represented by dashed line 226.

Figure 4B:
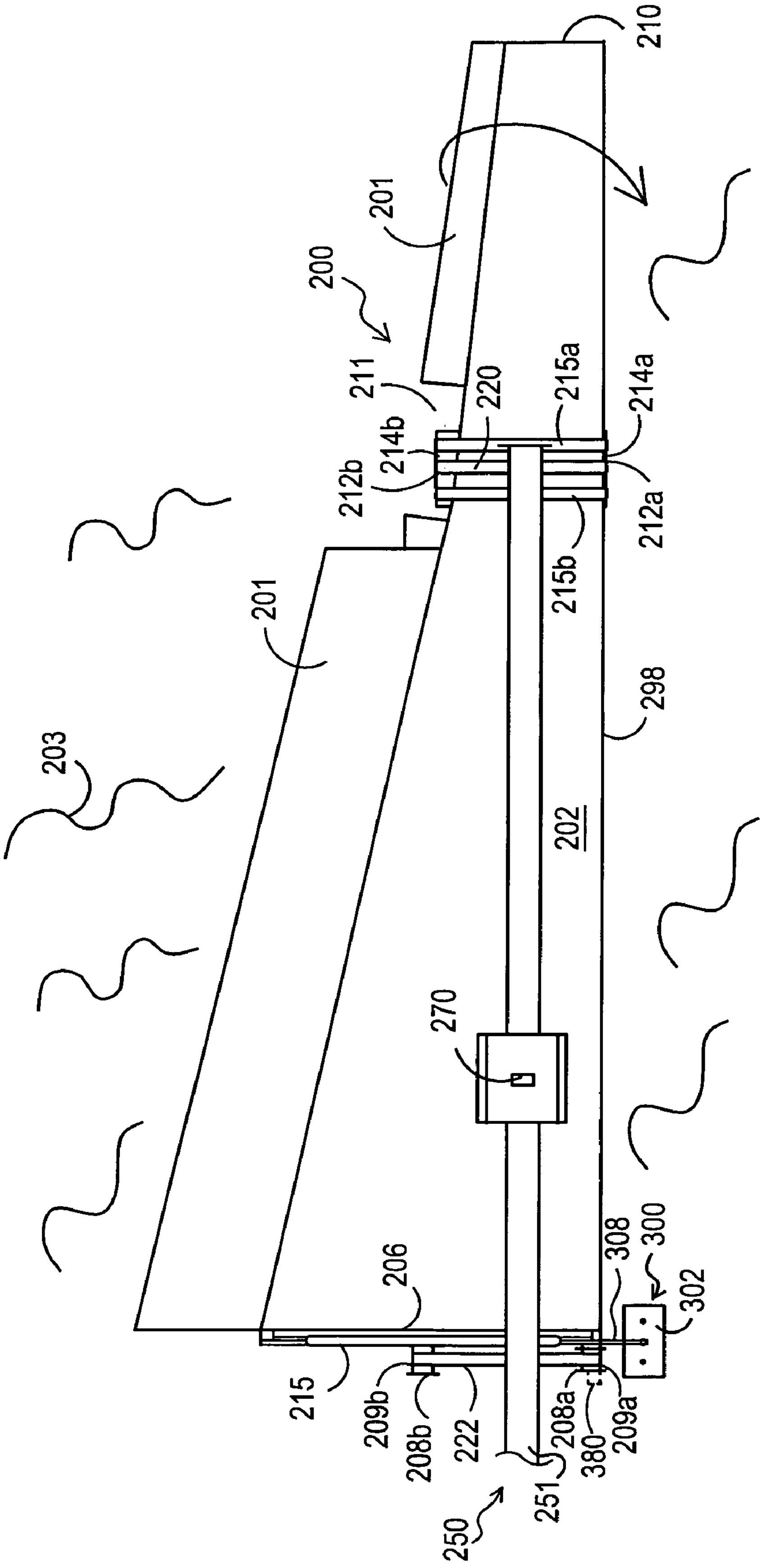
FIG. 4B illustrates an overhead view of a wing assembly suspended in upright horizontal position according to one exemplary embodiment of the disclosed systems and methods.

FIG. 4B illustrates an overhead view of wing assembly 200 of FIG. 3 that is suspended above a horizontal floor surface 203 in upright horizontal position by continuous slings 222 and 220, and lifting device 250, e.g., after being removed from an aircraft and lifted from a wing support tool. In FIG. 4B, pick point 270 is positioned over the adjusted suspended center of gravity of suspended wing assembly 200.

Figure 5:
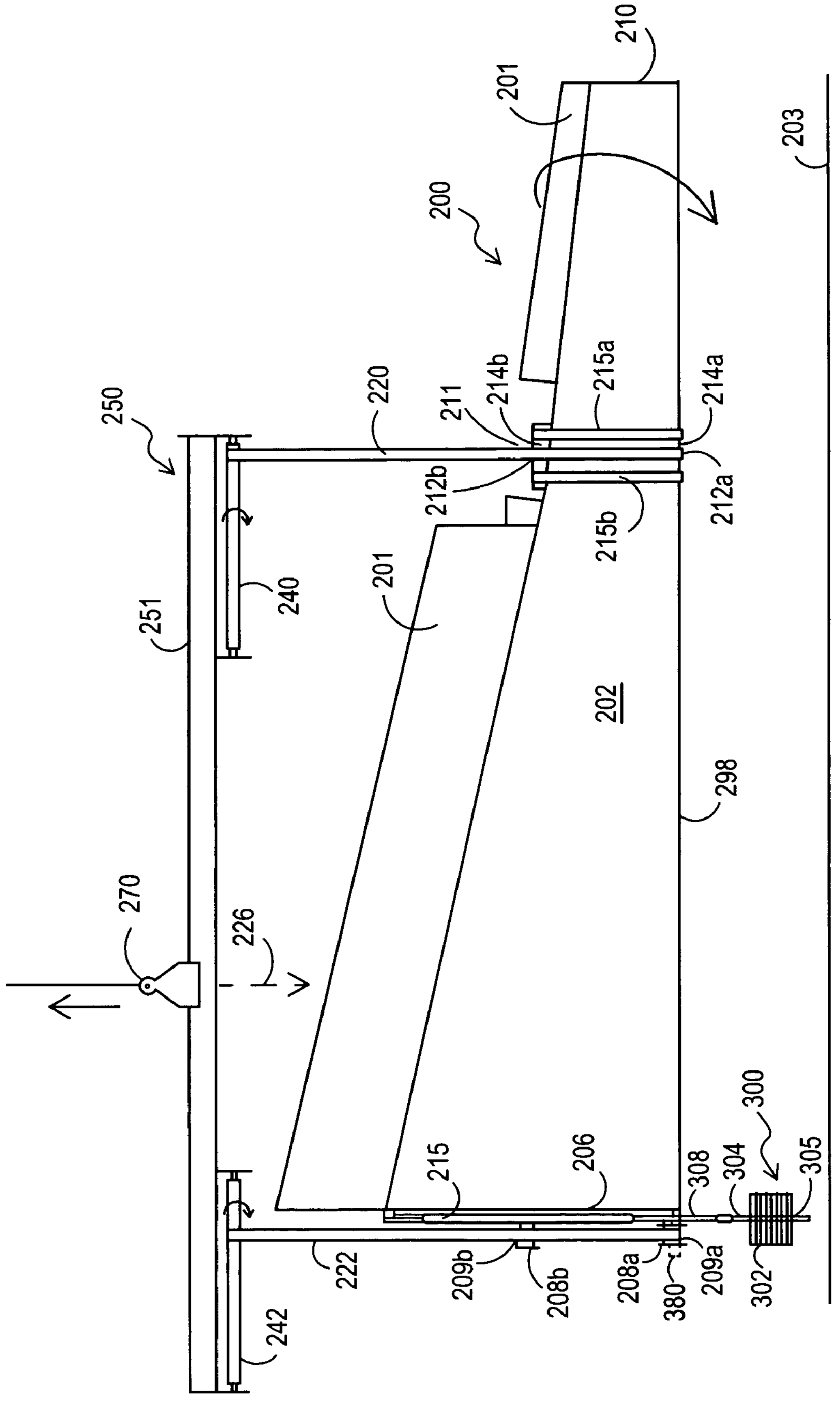
FIG. 5 illustrates a side view of a wing assembly suspended and rotated into vertical position according to one embodiment of the disclosed systems and methods.

FIG. 5 illustrates a side view of wing assembly 200 of FIG. 3 that is rotated into vertical position and suspended above a horizontal floor surface 203 by continuous slings 222 and 220, and lifting device 250. FIG. 5 shows pick point 270 positioned over the adjusted suspended center of gravity represented by dashed line 226.

Figure 6:
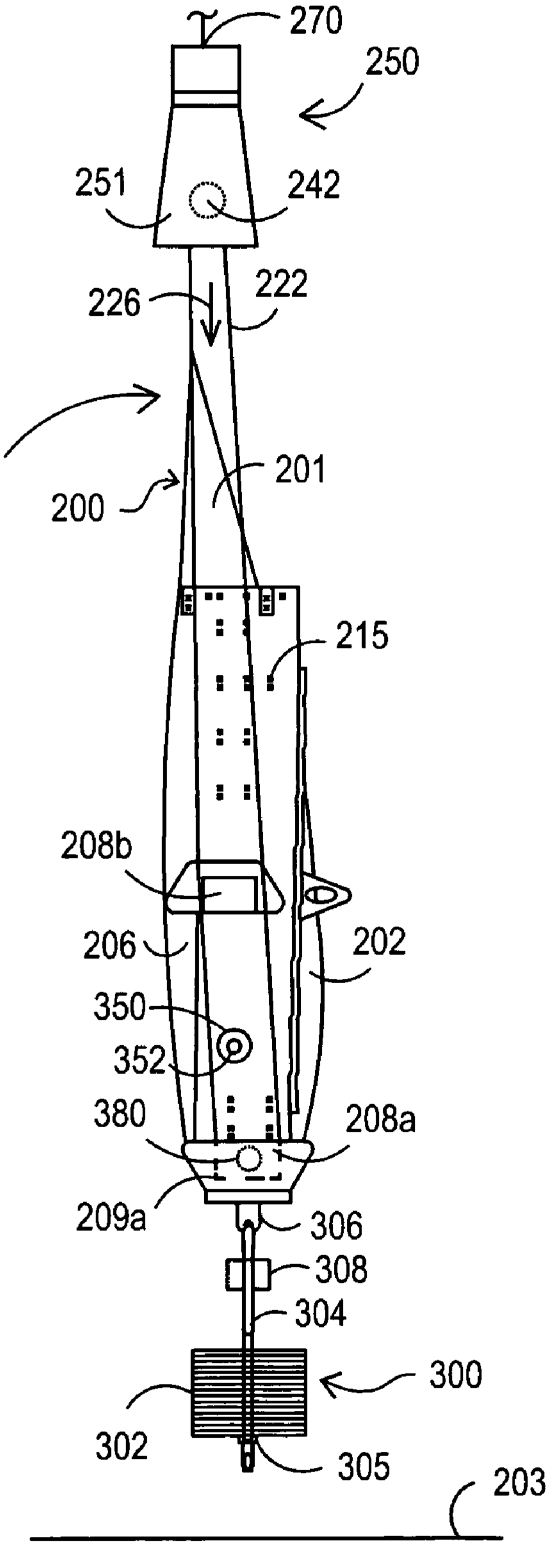
FIG. 6 illustrates a root edge end view of a wing assembly suspended and rotated into vertical position according to one embodiment of the disclosed systems and methods.

FIG. 6 illustrates a root edge end view of wing assembly 200 of FIG. 3 that is rotated into vertical position and suspended above a horizontal floor surface 203 by continuous slings 222 and 220, and lifting device 250. FIG. 6 shows pick point 270 positioned over the adjusted suspended center of gravity represented by dashed line 226.

Figure 7:
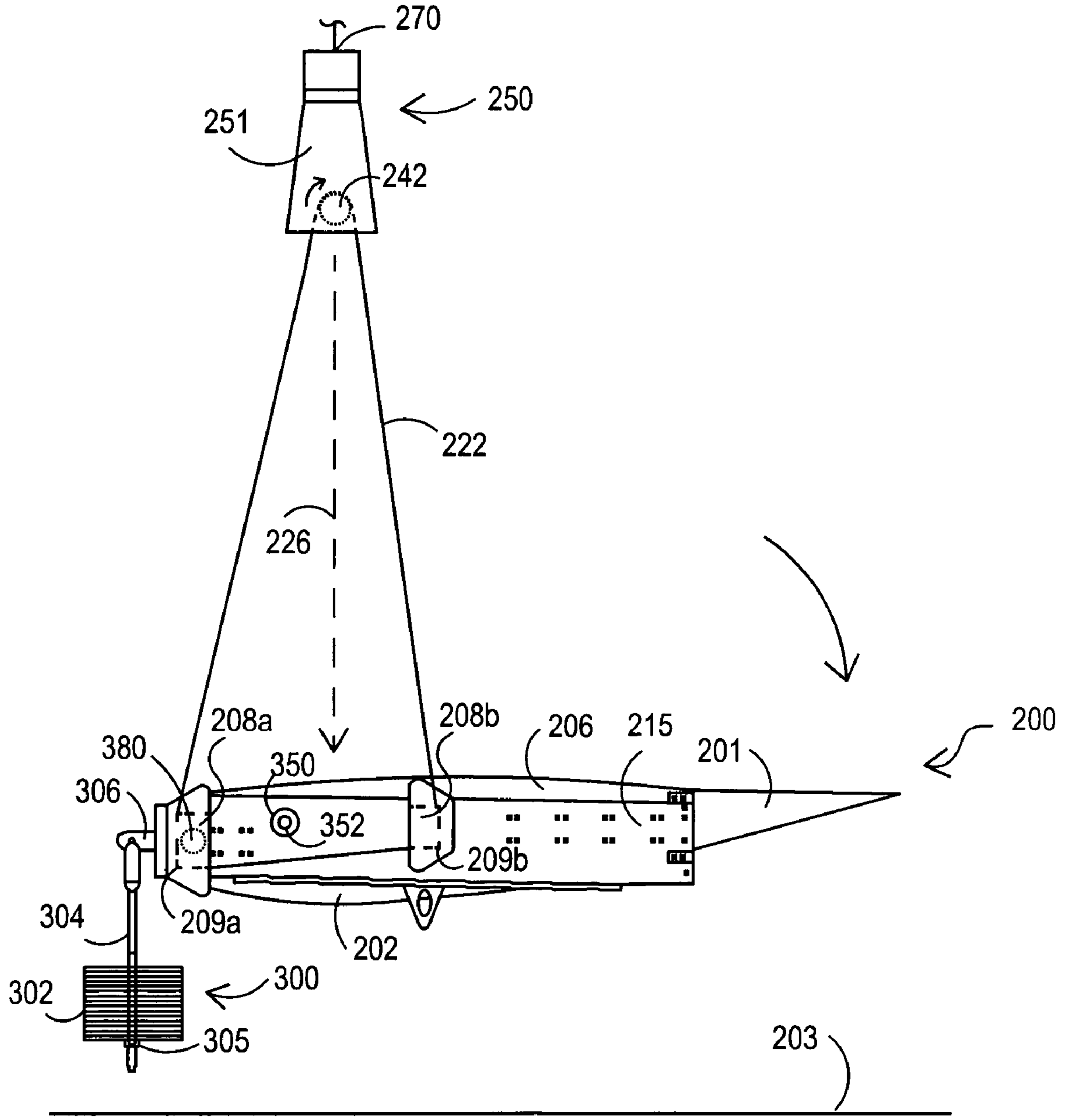
FIG. 7 illustrates an root edge end view of a wing assembly suspended and rotated into a horizontal inverted position according to one embodiment of the disclosed systems and methods.

FIG. 7 illustrates a root edge end view of wing assembly 200 that has been rotated by 180 degrees from a horizontal upright position into a horizontal inverted position and suspended above a horizontal floor surface 203 by continuous slings 222 and 220, and lifting device 250. FIG. 7 shows pick point 270 positioned over the adjusted suspended center of gravity represented by dashed line 226.

Although particular examples of an overhead lifting device 250 in the form of a powered sling material handling system that employs two continuous slings 220 and 222 has been described and illustrated herein, it will be understood that benefits of the disclosed systems and methods may be realized using any type of system and/or method that may be employed to suspend and rotate a wing assembly including, but not limited to, overhead lifting devices employing more than two continuous slings, overhead lifting devices that do not employ slings (e.g., that employ belts, chains or other suitable rotation mechanism), etc. In addition, the disclosed systems and methods may be practiced to suspend and rotate objects other than aircraft wing assemblies. Examples of other such objects include, but are not limited to, aircraft tail assemblies (vertical stabilizer or horizontal stabilizer component), etc.

Furthermore, it will be understood that in the practice of the disclosed systems and methods one or more external forces may be applied to an object having location, magnitude and direction that are effective to shift the suspended center of gravity of an object to a selected position, regardless of whether the non-adjusted suspended center of gravity is without or within the rotation axis area of the suspended object, and/or regardless of whether the non-adjusted suspended center of gravity is without or within the rotation axis area of the suspended object, e.g., the disclosed systems and methods may be employed to shift the suspended center of gravity from any given point to any other give point as may be needed or desired to fit the requirements of a given application. For example it may be desirable to shift the suspended center of gravity from a first position relatively farther from the rotational axis of an object to a second position that is relatively closer to the rotational axis of the object, regardless of whether the first and/or second positions are within or without the rotation axis area of the suspended object.

In addition, although an end fitting in the form of an end cap 215 is described and illustrated herein, it will be understood that an end fitting may be of any other suitable form for creating one or more support points for suspending and rotating an object. Furthermore, it will be understood that use of an end fitting is not necessary in all embodiments. For example, two or more continuous slings may encircle an object such as a wing box at points between the ends of the object, e.g., at points between the wing root edge and wing tip edge of a wing assembly.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of rotating an object having a center of gravity located at a first position within said object, comprising:
- suspending a first end of said object from a first set of spaced support points;
- suspending a second end of said object from a second set of spaced support points; and
- rotating said object simultaneously about said first and second sets of spaced support points, wherein a rotation axis area is defined between said first set of spaced support points and said second set of spaced support points; and
- applying at least one force to said object while rotating said object simultaneously about said first and second sets of spaced support points, said force being sufficient to shift the suspended center of gravity of said object from a position outside said rotation axis area to a position within said rotation axis area.

2. The method of claim 1, wherein at least a portion of said object lies outside said rotation axis area.

3. The method of claim 1, wherein said first end of said object has a length; and wherein a distance between said spaced points of said first set of spaced support points is less than said length of said first end of said object.

4. The method of claim 1, further comprising rotating said object about an axis of rotation; and applying said at least one force to said object to shift the suspended center of gravity of said object from a position outside said rotation axis area to a position substantially intersected by said axis of rotation.

5. The method of claim 1, wherein said object comprises an aircraft wing assembly, said aircraft wing assembly comprising a wing box and at least one stationary trailing edge wing component coupled to said wing box.

6. The method of claim 5, wherein said aircraft wing assembly comprises a P3 Orion aircraft wing assembly.

7. The method of claim 5, wherein said wing assembly comprises a root edge and a wing tip edge; wherein said first set of support points comprises first and second lifting horns provided at a root edge of said wing assembly; and wherein said second set of support points are positioned between said root edge and said wing tip edge of said wing assembly.

8. The method of claim 7, wherein said root edge of said wing assembly has a length; and wherein a distance between said spaced points of said first set of spaced support points is less than said length of said root edge of said wing assembly.

9. The method of claim 5, further comprising rotating said wing assembly about said first and second sets of spaced support points from horizontal upright position to horizontal inverted position while applying said at least one force to said object to shift the suspended center of gravity of said wing assembly from a position outside said rotation axis area to a position within said rotation axis area.

10. The method of claim 1, further comprising:
- suspending said first end of said object with a first rotatable sling, said first rotatable sling being coupled to suspend said first end of said object from said first set of spaced support points;
- suspending said second end of said object with a second rotatable sling, said second rotatable sling being coupled to suspend said second end of said object from said second set of spaced support points; and
- simultaneously rotating said first and second rotatable slings to impart rotation to said object.

11. The method of claim 10, wherein said first rotatable sling is coupled to suspend said first end of said object from an overhead lifting device; wherein said second rotatable sling is coupled to suspend said second end of said object from said overhead lifting device; and wherein rotation is imparted to said object by simultaneously rotating said first and second rotatable slings with said overhead lifting.

12. The method of claim 1, further comprising applying said force to said object using a force application device.

13. The method of claim 12, wherein said force application device comprises a pendant weight assembly.

14. The method of claim 1, further comprising rotating said object about said first and second sets of spaced support points by about 180 degrees while applying said at least one force to said object to shift the suspended center of gravity of said object from a position outside said rotation axis area to a position within said rotation axis area.

15. A method of rotating an aircraft wing assembly having a center of gravity located at a first position within said wing assembly, comprising:

suspending a first end of said wing assembly from a first set of spaced support points provided at a root edge of said wing assembly;

suspending a second end of said wing assembly from a second set of spaced support points provided at a position between said root edge and said wing tip edge of said wing assembly; and rotating said wing assembly simultaneously about said first and second sets of spaced support points, wherein a rotation axis area is defined between said first set of spaced support points and said second set of spaced support points; and applying at least one force to said wing assembly while rotating said object simultaneously about said first and second sets of spaced support points, said force being sufficient to shift the suspended center of gravity of said wing assembly from a position outside said rotation axis area to a position within said rotation axis area.

16. The method of claim 15, further comprising rotating said wing assembly about an axis of rotation; and wherein said method further comprises applying said at least one force to said wing assembly to shift the suspended center of gravity of said wing assembly from a position outside said rotation axis area to a position substantially intersected by said axis of rotation.

17. The method of claim 15, wherein said wing assembly comprises a wing box and at least one stationary trailing edge wing component coupled to said wing box.

18. The method of claim 17, wherein said wing assembly comprises a wing box and stationary flap and aileron sections coupled to said wing box.

19. The method of claim 17, wherein said aircraft wing assembly comprises a P3 Orion aircraft wing assembly.

20. The method of claim 17, wherein said first set of support points comprises first and second lifting horns of an end fitting that is attached to a root edge of said wing assembly; and wherein said second set of support points are positioned between said root edge and said wing tip edge of said wing assembly.

21. The method of claim 20, further comprising applying said force to said wing assembly using a force application device.

22. The method of claim 21, wherein said force application device comprises a pendant weight assembly.

23. The method of claim 20, further comprising:

suspending said first end of said wing assembly from an overhead lifting device with a first rotatable sling, said first rotatable sling being coupled to suspend said first end of said wing assembly from said first set of spaced support points;

suspending said second end of said wing assembly from said overhead lifting device with a second rotatable sling, said second rotatable sling being coupled to suspend said second end of said wing assembly from said second set of spaced support points; and simultaneously rotating said first and second rotatable slings to impart rotation to said wing assembly.

24. The method of claim 15, further comprising rotating said wing assembly about said first and second sets of spaced support points from horizontal upright position to horizontal inverted position while applying said at least one force to said object to shift the suspended center of gravity of said wing assembly from a position outside said rotation axis area to a position within said rotation axis area.

* * * * *